United States Patent
Dunning et al.

(10) Patent No.: US 10,638,168 B2
(45) Date of Patent: Apr. 28, 2020

(54) DETECTING MINIMUM VIABLE DISPLAY RESOLUTION OF MEDIA CONTENT USING OPTICAL CHARACTER RECOGNITION

(71) Applicant: INTERNATIONAL BUSINESS MACHINES CORPORATION, Armonk, NY (US)

(72) Inventors: Jack E. Dunning, Lyndhurst (GB); Thomas J. Latham, Eastleigh (GB); Jordan R. Cain, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/123,566

(22) Filed: Sep. 6, 2018

(65) Prior Publication Data
US 2020/0084485 A1    Mar. 12, 2020

(51) Int. Cl.
*H04N 21/2343*    (2011.01)
*H04N 21/258*    (2011.01)
(Continued)

(52) U.S. Cl.
CPC .. *H04N 21/234363* (2013.01); *G06K 9/00765* (2013.01); *G06K 9/344* (2013.01);
(Continued)

(58) Field of Classification Search
CPC ..... H04N 21/234363; H04N 21/25825; H04N 21/2662; H04N 21/8547; H04N 5/23232;
(Continued)

(56) References Cited

U.S. PATENT DOCUMENTS 7,198,930 B2 *  4/2007  Kapeller-Libermann ............... C07K 16/40
                                                                  435/194
7,298,930 B1 *  11/2007  Erol .................. G06K 9/00711
                                                                  382/305
(Continued)

FOREIGN PATENT DOCUMENTS

WO    2015183914 A1    12/2015

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Dramos Kalapodas
(74) *Attorney, Agent, or Firm* — Rakesh Roy

(57) ABSTRACT

A method, computer system, and a computer program product for detecting a minimum viable display resolution is provided. The present invention may include measuring a first quality indicator of a received video file in an original resolution of the received video file. The present invention may then include measuring a second quality indicator of the received video file in a newest resolution of the received video file, wherein the newest resolution of the received video file is a lower resolution relative to the original resolution of the received video file. The present invention may further include, in response to determining that the measured second quality indicator of the newest resolution does not meet a threshold associated with the measured first quality indicator of the original resolution, discarding the newest resolution of the received video file and storing at least one viable display resolution of the received video file.

14 Claims, 5 Drawing Sheets

(51) Int. Cl.
    H04N 21/2662    (2011.01)
    G06K 9/00       (2006.01)
    G06K 9/34       (2006.01)
    H04N 21/8547    (2011.01)
(52) U.S. Cl.
    CPC ... *H04N 21/25825* (2013.01); *H04N 21/2662* (2013.01); *H04N 21/8547* (2013.01); *G06K 2209/01* (2013.01)
(58) Field of Classification Search
    CPC ........... H04N 5/23216; H04N 5/23222; H04N 5/23293; G06K 9/00765; G06K 9/344; G06K 2209/01; G06K 9/18
    See application file for complete search history.

(56) References Cited

U.S. PATENT DOCUMENTS

| | | | |
|---|---|---|---|
| 8,515,185 B2 | 8/2013 | Lee et al. | |
| 9,256,922 B2 | 2/2016 | Zagaynov et al. | |
| 9,554,142 B2 | 1/2017 | Guerrero | |
| 2002/0146075 A1* | 10/2002 | Kauffman | G11B 27/034 375/240.28 |
| 2002/0146236 A1* | 10/2002 | Kauffman | G11B 27/034 386/281 |
| 2003/0033347 A1* | 2/2003 | Bolle | G06K 9/00711 718/107 |
| 2016/0309085 A1* | 10/2016 | Ilic | H04N 5/23293 |
| 2017/0062013 A1* | 3/2017 | Carter | G11B 27/34 |
| 2018/0204111 A1* | 7/2018 | Zadeh | G06N 3/0436 |
| 2018/0270531 A1* | 9/2018 | Ye | H04N 21/44218 |

OTHER PUBLICATIONS

OCR Space, "Free OCR API and Online OCR," Best Free OCR API, Online OCR, Searchable PDF, p. 1-4, https://ocr.space/, Accessed on Sep. 4, 2018.

* cited by examiner

DETECTING MINIMUM VIABLE DISPLAY RESOLUTION OF MEDIA CONTENT USING OPTICAL CHARACTER RECOGNITION

BACKGROUND

The present invention relates generally to the field of computing, and more particularly to graphical user interface technology.

Many media streaming services host multiple resolutions of a video content so that the video content can reach more end users. To that end, when video content is uploaded to a media streaming service, the media streaming service will transcode the video content to multiple resolutions, including the original resolution, and several lower resolutions. The media streaming service will typically deliver a lower resolution version of the video content in order to preserve a fluid streaming experience (e.g., not pausing to buffer) for viewers without sufficient network bandwidth. However, for some video content, viewers may deem the lower resolution versions to be insufficient for the intended purpose of the media.

Transcoding is computationally intensive and usually requires powerful machine resources. The production of video content with resolutions that are too low to be consumed by viewers increases the associated processing costs, including, the machines required to process the lower resolution video content and the disk storage required to store the lower resolution video content. In addition, if viewers cannot consume the video content at the low resolution, data resources may be wasted in re-requesting the video content at a higher resolution.

SUMMARY

Embodiments of the present invention disclose a method, computer system, and a computer program product for detecting a minimum viable display resolution. The present invention may include receiving a video file. The present invention may also include measuring a first quality indicator of the received video file in an original resolution of the received video file. The present invention may then include measuring a second quality indicator of the received video file in a newest resolution of the received video file, wherein the newest resolution of the received video file is a lower resolution relative to the original resolution of the received video file. The present invention may further include, in response to determining that the measured second quality indicator of the newest resolution does not meet a threshold associated with the measured first quality indicator of the original resolution, discarding the newest resolution of the received video file and storing at least one viable display resolution of the received video file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
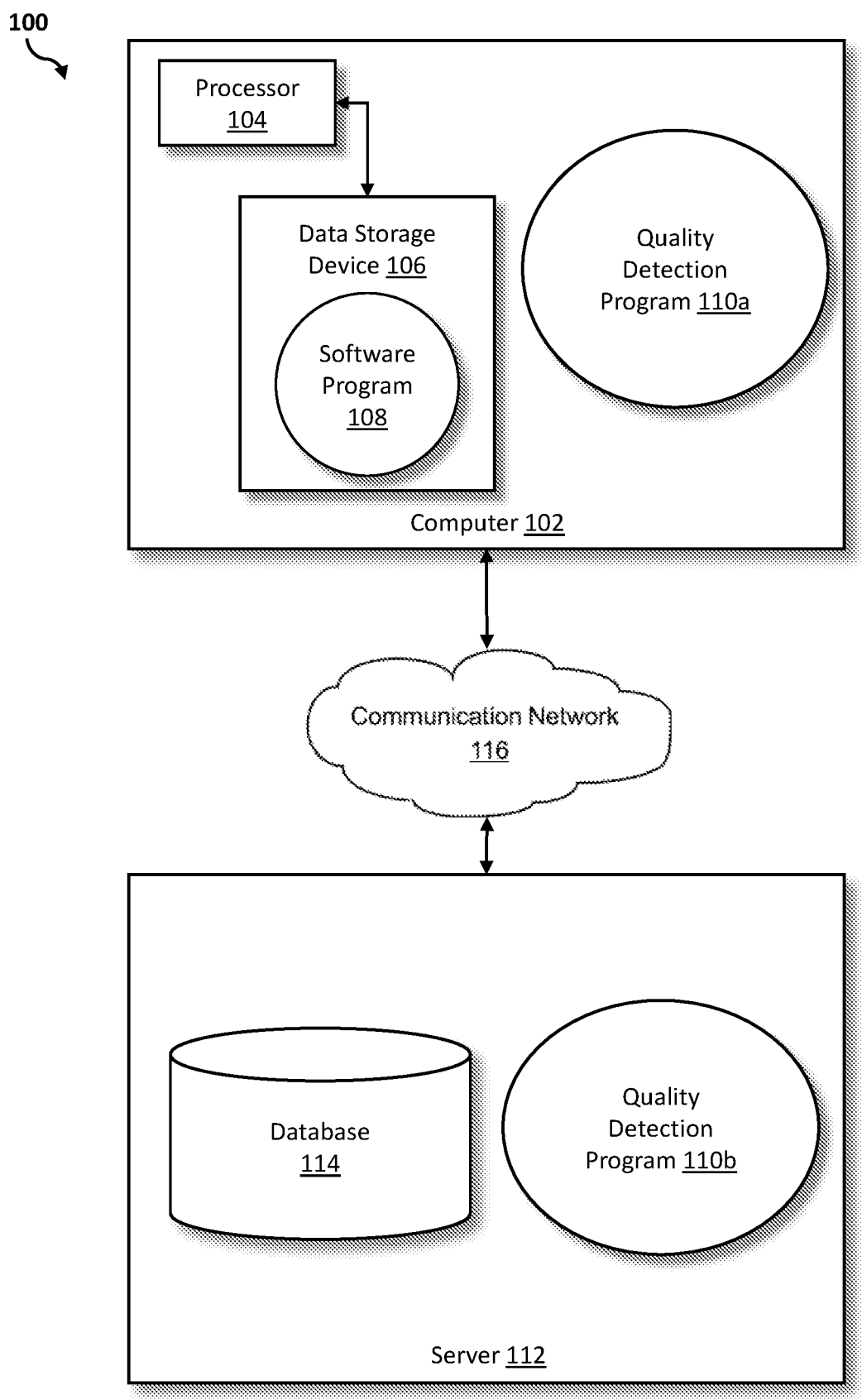
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for detecting the minimum viable display resolution of media content using optical character recognition ("OCR"). As such, the present embodiment has the capacity to improve the technical field of a graphical user interface by detecting if or when the resolution of a video content becomes too low for an end-user or a viewer to consume the media. More specifically, a media streaming service may analyze a video content at different resolutions after the initial upload and detect if/when the resolution of the uploaded video content becomes too low for the intended purpose of the media. After the media streaming service determines the lowest consumable or acceptable resolution, the media streaming service may not transcode the video content to further lower resolutions and therefore may remove the need to store the video content at resolutions that the viewer may find unacceptable.

As described previously, many media streaming services host multiple resolutions of a video content so that the video content can reach more end users. To that end, when a video content is uploaded to a media streaming service, the media streaming service will transcode the video content to multiple resolutions, including the original resolution, and several lower resolutions. The media streaming service will typically deliver a lower resolution version of the video content in order to preserve a fluid streaming experience (e.g., not pausing to buffer) for viewers without sufficient network bandwidth. However, for some video content, viewers may deem the lower resolution versions to be insufficient for the intended purpose of the media.

Transcoding is computationally intensive and usually requires powerful machine resources. The production of video content with resolutions that are too low to be consumed by viewers increases the associated processing costs, including, the machines required to process the lower resolution video content and the disk storage required to store the lower resolution video content. In addition, if viewers cannot consume the video content at the low resolution, data resources may be wasted in re-requesting the video content at a higher resolution.

Therefore, it may be advantageous to, among other things, provide a way to detect the minimum viable display resolution of a video content that a viewer may find acceptable. Accordingly, the computational resources and costs associated with transcoding and storing the video content at further lower resolutions may be saved.

According to at least one embodiment, when a video is uploaded to a media streaming service, the quality detection program may start analyzing the video at the original upload resolution of the video. For example, the media streaming service may receive the video uploaded with a resolution of 1080p. Using the 1080p video, a detection component may perform an optical character recognition (OCR) on key frames in the video in order to detect any text depicted in the video. The quality detection program may then log the detected text and the corresponding key frame in the video. The quality detection program may then transcode the video to the next lowest resolution (e.g., 720p) and perform the OCR on the same key frames. The detected text for the newest resolution (e.g., 720p) may be logged and compared with the previous data to determine if a significant degradation is found in the logged detected text. The quality detection program may implement a threshold at which the resolution quality of the newest detected text may be deemed too low. In one embodiment, OCR may be used to determine the level of similarity between an original and a lower quality copy of a video to decide whether the video may be of too poor quality to be consumed by the viewer. Thereafter, the quality detection program may not produce lower quality versions of the uploaded video.

According to at least one embodiment, the quality detection program may determine the minimum viable display resolution for videos with significant on-screen textual content. Therefore, the quality detection program may implement a pre-processing component to reduce the number of videos being analyzed which contain no significant on-screen text. In one embodiment, the pre-processing component may screen (e.g., via natural language processing) the descriptions of the uploaded videos for specific tags or words (e.g., education, programming, tutorial, guide) which may indicate significant on-screen textual content. In another embodiment, the pre-processing component may access the historical data of a video uploader to determine if previously uploaded videos had significant on-screen textual content. In at least one embodiment, the quality detection program may include a pre-processing operation in which, upon completion of the first set of OCR scans for the video at the highest quality, if too few words are detected, the quality detection program may abandon the detection process and continue with a default upload procedure.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a quality detection program 110a. The networked computer environment 100 may also include a server 112 that is enabled to run a quality detection program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the quality detection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the quality detection program 110a, 110b (respectively) to detect the minimum viable display resolution of a media content using optical character recognition ("OCR"). The minimum viable display resolution detection method is explained in more detail below with respect to FIG. 2.

Figure 2:
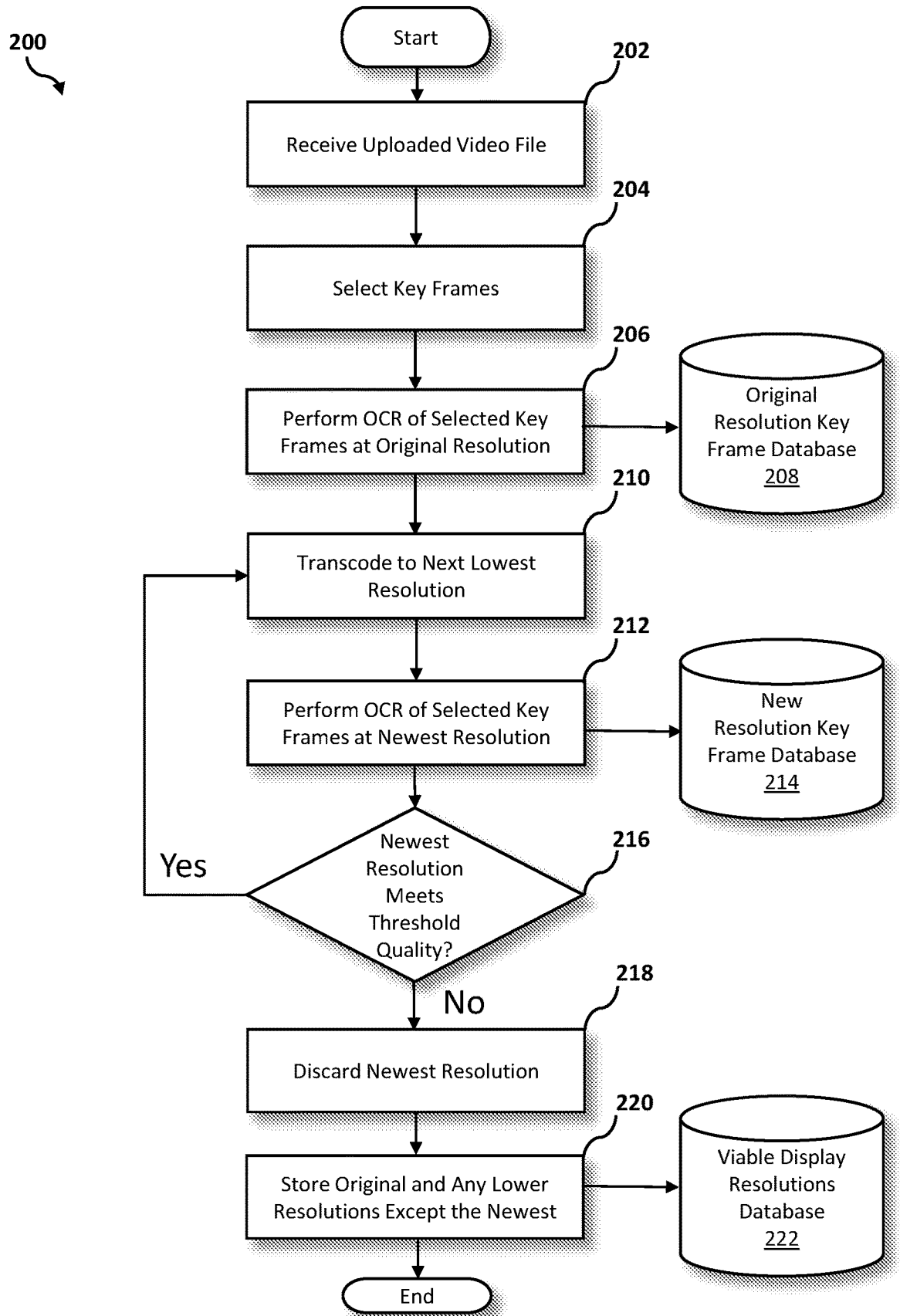
FIG. 2 is an operational flowchart illustrating a process for detecting the minimum viable display resolution of a media content using optical character recognition according to at least one embodiment.

Referring now to FIG. 2, an operational flowchart illustrating the exemplary viable resolution detection process 200 used by the quality detection program 110a, 110b according to at least one embodiment is depicted.

At 202, an uploaded video file is received. A media streaming service running a quality detection program 110a, 110b may receive (e.g., via communication network 116) a video file uploaded from a user device (e.g., client computer 102). The quality detection program 110a, 110b may be provided as an application-programming interface ("API") or any suitable web tool which may be accessed and implemented by the media streaming service. After receiving the uploaded video file, the quality detection program 110a, 110b may access the video file properties to determine an original resolution of the uploaded video file. The original resolution of the uploaded video file may serve as the highest resolution version of the video file hosted on the media streaming service. The original resolution of the uploaded video file may also serve as the starting resolution in the viable resolution detection process 200 used by the quality detection program 110a, 110b.

In one embodiment, the media streaming service may invoke the quality detection program 110a, 110b for uploaded video files with significant on-screen textual content. As such, the quality detection program 110a, 110b may include a pre-processing component which may be implemented to screen out video files that contain no significant on-screen text. In one embodiment, the pre-processing component may read (e.g., via natural language processing) the description of the uploaded video file to identify specific tags or words (e.g., education, programming, tutorial, guide) which may indicate significant on-screen textual content. In another embodiment, the pre-processing component may access a video upload history (e.g., historical data) of the user to determine if the user previously uploaded video files with significant on-screen textual content (e.g., video content on education, programming, tutorials). The threshold for significant on-screen textual content (e.g., 80% on-screen textual content) may be customizable by the media streaming service using the quality detection program 110a, 110b. If the pre-processing component determines (e.g., by identifying specific tags or words in the description of the video file) that the uploaded video file does not have significant on-screen text, the quality detection program 110a, 110b may abandon the viable resolution detection process 200 for the uploaded video file and the media streaming service may continue with a default transcoding procedure for the uploaded video file.

In one example, a user interacts with a laptop to upload, via communication network 116, a video file including a java programming tutorial to a media streaming service. The quality detection program 110a, 110b, implemented in the media streaming service as an API, receives the uploaded video file, and accesses the video file properties to determine that the user uploaded the video with an original resolution of 1920×1080 or 1080p. Additionally, a pre-processing component of the quality detection program 110a, 110b, applies natural language processing to read the user description of the uploaded video file. In reading the user description, "Java Programming Tutorial for Beginners," the pre-processing component identifies the specific tags "programming," and "tutorial" and determines that the uploaded video file will include significant on-screen textual content.

Then, at 204, key frames are selected. The quality detection program 110a, 110b may select the key frames in the video file which may serve as the comparison or test frames when determining the difference in quality between an original and a lower resolution version of the uploaded video file. In one embodiment, the quality detection program 110a, 110b may select the key frames at a pre-defined frequency (e.g., every 10 seconds over the duration of the video). In at least one embodiment, the quality detection program 110a, 110b may provide an administrator of the media streaming service with the option to set the pre-defined frequency for selecting the key frames. The media streaming service may set the key frames to be selected more frequently (e.g., every three seconds over the duration of the video) to increase the accuracy of the quality detection program 110a, 110b. However, the media streaming service may incur the additional costs associated with selecting the key frames more frequently. In another embodiment, the quality detection program 110a, 110b may select only one key frame to serve as the comparison or test frame when determining the difference in quality between an original and a lower resolution version of the uploaded video file.

Continuing with the previous example, the quality detection program 110a, 110b selects the key frames of the uploaded video file at a pre-defined frequency of 10 seconds over a duration of the one-minute long uploaded video file. Accordingly, the quality detection program 110a, 110b sets the selected key frames at timestamps: 0:10/1:00; 0:20/1:00; 0:30/1:00; 0:40/1:00; 0:50/1:00; and 1:00/1:00 as the comparison frames for the various resolutions of the uploaded video file.

Then, at 206, OCR of the selected key frames is performed at the original resolution. The quality detection program 110a, 110b may measure a quality indicator of the selected key frames in the original resolution. In one embodiment, the quality detection program 110a, 110b may include an OCR component for detecting the text depicted in each frame of the selected key frames. The quality detection program 110a, 110b may perform the OCR at the original resolution of the uploaded video file and may set the OCR data for the original resolution as a baseline for comparing against the OCR data for lower resolutions of the video file. In one embodiment, the OCR component of the quality detection program 110a, 110b may measure and return a number of texts (e.g., words) detected in each frame of the selected key frames at the original resolution. In one embodiment, the quality detection program 110a, 110b may record the OCR data of the original resolution as the number of words detected in each frame of the selected key frames (e.g., recorded as "timestamp: detected text on screen"). In one embodiment, the quality detection program 110a, 110b may aggregate the number of words detected across the selected key frames and store the aggregate word count as part of the OCR data of the original resolution. The quality detection program 110a, 110b may store the OCR data of the original resolution in a first or original resolution key frame database 208 (e.g., transmitting the data via communication network 116).

Continuing with the previous example, the quality detection program 110a, 110b performs an OCR of the selected key frames—in the original 1080p resolution of the uploaded video file—at the timestamps: 0:10/1:00; 0:20/1:00; 0:30/1:00; 0:40/1:00; 0:50/1:00; and 1:00/1:00. The OCR component of the quality detection program 110a, 110b returns 50 detected words at 0:10/1:00; 70 detected words at 0:20/1:00; 90 detected words at 0:30/1:00; 110 detected words at 0:40/1:00; 130 detected words at 0:50/1:00; and 50 detected words at 1:00/1:00. Then, the quality detection program 110a, 110b records the OCR data of the original 1080p resolution as: "0:10/1:00: 50;" "0:20/1:00: 70;" "0:30/1:00: 90;" "0:40/1:00: 110;" "0:50/1:00: 130;" and "1:00/1:00: 50." The quality detection program 110a, 110b also aggregates the number of words detected across the six selected key frames and returns 500 detected words. Thereafter, the quality detection program 110a, 110b transmits the OCR data (detected words in each frame and aggregate detected words), via communication network 116, to the original resolution key frame database 208 for storage.

Then, at 210, a next lowest resolution is transcoded. The quality detection program 110a, 110b may convert the uploaded video file to the next lowest resolution using one or more known transcoding processes. In one embodiment, the next lowest resolution of the video file may include the next lowest resolution (e.g., 720p) after the original resolution (e.g., 1080p) of the uploaded video file. In another embodiment, the next lowest resolution of the video file may include the next lowest resolution (e.g., 480p) after the previous higher resolution (e.g., 720p) of the uploaded video file. In one embodiment, the quality detection program 110a, 110b may set the next lowest resolution as the newest resolution of the uploaded video file for the purpose of comparison against the original resolution of the uploaded video file.

Continuing with the previous example, the quality detection program 110a, 110b determines that the next lowest resolution of the uploaded video file—uploaded with an original resolution of 1080p—is 720p. Accordingly, the quality detection program 110a, 110b transcodes the uploaded video file to the next lowest resolution of 720p.

The quality detection program 110a, 110b then sets the 720p resolution of the uploaded video file as the newest resolution of the uploaded video file.

Then, at 212, an OCR of the selected key frames is performed at the newest resolution. After transcoding the uploaded video file to the next lowest resolution at 210, the quality detection program 110a, 110b may measure a quality indicator of the selected key frames in the next lowest resolution (e.g., newest resolution). In one embodiment, the quality detection program 110a, 110b may perform an OCR of the key frames of the uploaded video file selected at the pre-defined frequency (e.g., every 10 seconds over the duration of the video) at 204. The quality detection program 110a, 110b may perform the OCR of the selected key frames at the newest resolution similar to how the OCR of the selected key frames may be performed at 206. Accordingly, the OCR component of the quality detection program 110a, 110b may measure and return a number of texts (e.g., words) detected in each frame of the selected key frames at the newest resolution. In one embodiment, the quality detection program 110a, 110b may record the OCR data of the newest resolution as the number of words detected in each frame of the selected key frames (e.g., recorded as "timestamp: detected text on screen"). In one embodiment, the quality detection program 110a, 110b may aggregate the number of words detected across the selected key frames and store the aggregate word count as part of the OCR data of the newest resolution. The quality detection program 110a, 110b may store the OCR data of the newest resolution in a second or new resolution key frame database 214 (e.g., transmitting the data via communication network 116).

Continuing with the previous example, the quality detection program 110a, 110b performs an OCR of the selected key frames (selected at 204)—in the newest 720p resolution of the uploaded video file—at the timestamps: 0:10/1:00; 0:20/1:00; 0:30/1:00; 0:40/1:00; 0:50/1:00; and 1:00/1:00. The OCR component of the quality detection program 110a, 110b returns 40 detected words at 0:10/1:00; 60 detected words at 0:20/1:00; 80 detected words at 0:30/1:00; 100 detected words at 0:40/1:00; 125 detected words at 0:50/1:00; and 45 detected words at 1:00/1:00. Then, the quality detection program 110a, 110b records the OCR data of the newest 720p resolution as: "0:10/1:00: 40;" "0:20/1:00: 60;" "0:30/1:00: 80;" "0:40/1:00: 100;" "0:50/1:00: 125;" and "1:00/1:00: 45." The quality detection program 110a, 110b also aggregates the number of words detected across the six selected key frames at the newest 720p resolution and returns 450 detected words. Thereafter, the quality detection program 110a, 110b transmits the OCR data for the newest 720p resolution (detected words in each frame and aggregate detected words), via communication network 116, to the new resolution key frame database 214 for storage.

Then, at 216, the quality detection program 110a, 110b determines if the newest resolution meets a threshold quality. The quality detection program 110a, 110b may compare the OCR data for the newest resolution of the uploaded video file (e.g., aggregate detected words recorded in the database 214) against the OCR data for the original resolution of the uploaded video file (e.g., aggregate detected words recorded in the database 208) to determine if the newest resolution meets the threshold quality. In one embodiment, the quality detection program 110a, 110b may implement a pre-defined threshold quality. In at least one embodiment, the pre-defined threshold quality may require that the aggregate detected words across the selected key frames in the newest resolution includes more than 80% of the aggregate detected words across the selected key frames in the original resolution. In another embodiment, the quality detection program 110a, 110b may provide the administrator of the media streaming service with the option to set the pre-defined threshold quality for the newest resolution.

If the quality detection program 110a, 110b determines that the newest resolution meets the threshold quality at 216, then, the quality detection program 110a, 110b transcodes the uploaded video file to the next lowest resolution from the newest resolution at 210 (e.g., from 720p to 480p). In another embodiment, the quality detection program 110a, 110b may determine that a newest resolution of the uploaded video meets the threshold (e.g., 80%) exactly, indicating that a lower resolution will fall below the threshold, therefore the quality detection program 110a, 110b may end the process of transcoding to the next lowest resolution, saving additional computational resources and costs.

Continuing with the previous example, the quality detection program 110a, 110b provides a pre-defined threshold quality which requires the aggregate detected words across the six selected key frames in the newest 720p resolution to include more than 80% of the aggregate detected words across the six selected key frames in the original 1080p resolution. The quality detection program 110a, 110b retrieves, via communication network 116, the OCR data (450 aggregate detected words) for the newest resolution (720p) of the uploaded video file from the new resolution key frame database 214. Similarly, the quality detection program 110a, 110b retrieves, via communication network 116, the OCR data (500 aggregate detected words) for the original resolution (1080p) of the uploaded video file from the original resolution key frame database 208. Based on the retrieved OCR data, the quality detection program 110a, 110b determines whether the 450 aggregate detected words for the newest resolution (720p) is more than 80% of the 500 aggregate detected words for the original resolution (1080p). In response, the quality detection program 110a, 110b calculates that the 450 aggregate words for the newest resolution (720p) is 90% of the 500 aggregate detected words for the original resolution (1080p). Accordingly, the quality detection program 110a, 110b determines that the newest resolution (720p) of the uploaded video file meets the 80% pre-defined threshold quality at 216. As such, the quality detection program 110a, 110b returns to 210, and transcodes the uploaded video file to 480p, the next lowest resolution from the newest resolution of 720p.

However, if the quality detection program 110a, 110b determines that the newest resolution does not meet the threshold quality at 216, then, the quality detection program 110a, 110b determines that the newest resolution of the uploaded video file is unacceptable for the viewer and discards the newest resolution of the uploaded video file at 218. Continuing with the previous example, the quality detection program 110a, 110b retrieves, via communication network 116, an OCR data (200 aggregate detected words across the six selected key frames) for a newest resolution (240p) of the uploaded video file from the new resolution key frame database 214, and similarly retrieves, via communication network 116, the OCR data (500 aggregate detected words across the six selected key frames) for the original resolution (1080p) of the uploaded video file from the original resolution key frame database 208. Based on the retrieved OCR data, the quality detection program 110a, 110b determines whether the 200 aggregate detected words for the newest resolution (240p) is more than 80% of the 500 aggregate detected words for the original resolution (1080p). In response, the quality detection program 110a, 110b calculates that the 200 aggregate detected words for the newest resolution (240p) is 40% of the 500 aggregate detected words for the original resolution (1080p). Accordingly, the quality detection program 110a, 110b determines that the newest resolution (240p) of the uploaded video file does not meet the 80% pre-defined threshold quality at 216. As such, the quality detection program 110a, 110b discards the newest resolution (240p) of the uploaded video file at 218.

Then, at 220, the quality detection program 110a, 110b stores the original resolution of the uploaded video file and all lower resolutions of the uploaded video file, except the newest resolution of the uploaded video file. In one embodiment, the quality detection program 110a, 110b may store (e.g., transmitting the data via communication network 116) the original resolution of the uploaded video file and all lower resolutions of the uploaded video file, except the newest resolution of the uploaded video file (e.g., all the viable display resolutions of the uploaded video file) to a viable display resolutions database 222. The media streaming service may determine which resolutions of the uploaded video file to host based on the viable display resolutions (e.g., 1080p, 720p, 480p) recorded by the quality detection program 110a, 110b in the viable display resolutions database 222.

Continuing with the previous example, the quality detection program 110a, 110b stores the original resolution (1080p) of the uploaded video file and all lower resolutions of the uploaded video file (720p, 480p, and 360p), except the newest resolution (240p) of the uploaded video file, to a viable display resolutions database 222 as the viable display resolutions. The quality detection program 110a, 110b transmits the data to the viable display resolutions database 222 via communication network 116. Thereafter, the media streaming service accesses the viable display resolutions database 222 via communication network 116, and determines to host the 1080p, 720p, 480p, and 360p resolution versions of the uploaded video file of the user.

As described herein, the quality detection program 110a, 110b may have the capacity to improve the technical field of graphical user interfaces by providing for the detection of the minimum viable display resolution of a media content. The quality detection program 110a, 110b may enable media streaming services to determine which resolutions of an uploaded video file to host and which lower resolutions of the uploaded video file to discard, based on the detection of the minimum viable display resolution of the uploaded video file. Accordingly, the media streaming services may transcode the uploaded video files to resolutions that may be consumed by the viewer while saving the computational resources and costs associated with transcoding and storing the uploaded video file at further lower resolutions. Thus, the quality detection program 110a, 110b may improve the functionality of a computer.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
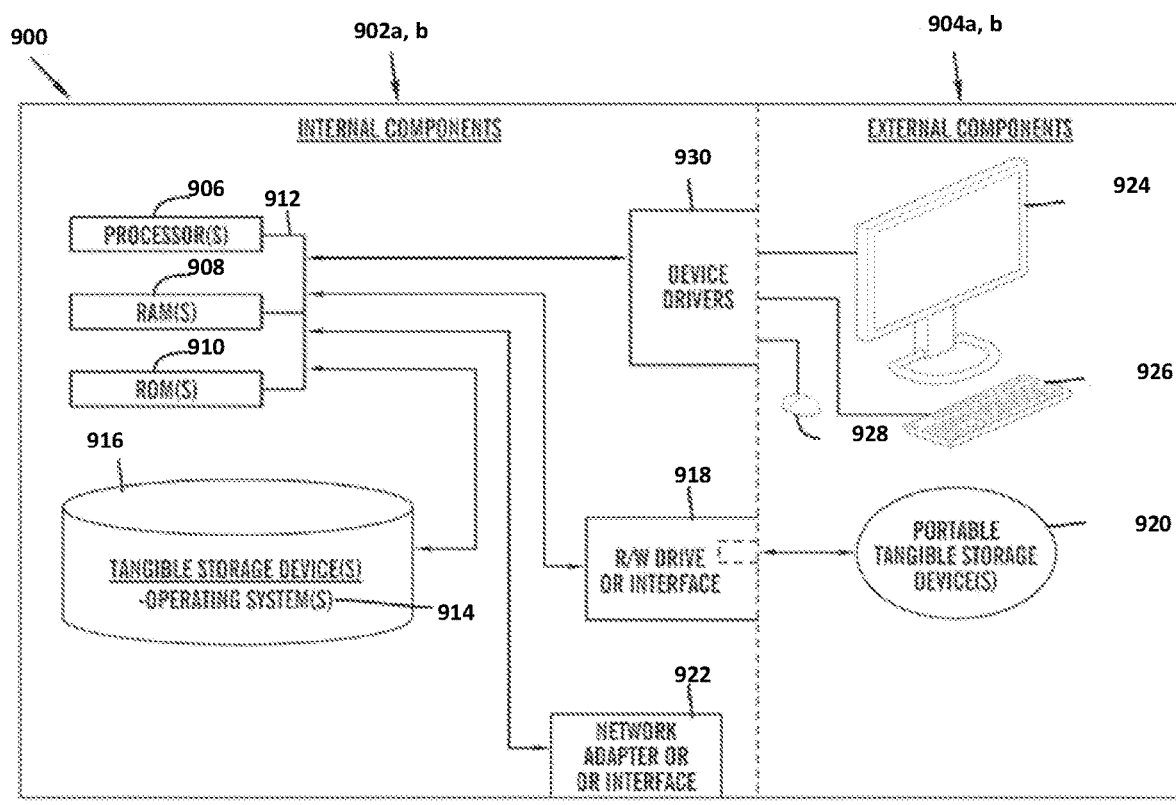
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the quality detection program 110a in client computer 102, and the quality detection program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the quality detection program 110a, 110b can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the quality detection program 110a in client computer 102 and the quality detection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the quality detection program 110a in client computer 102 and the quality detection program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
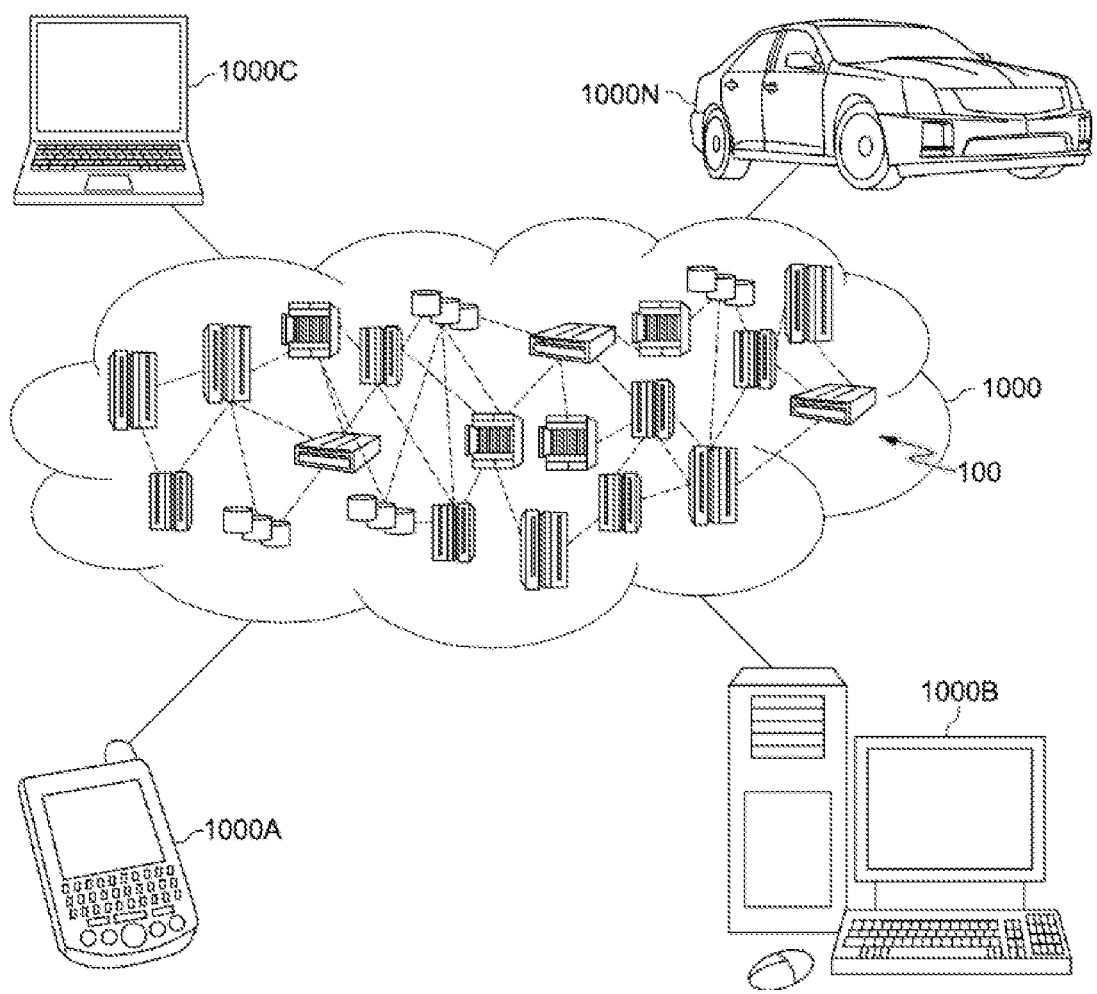
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
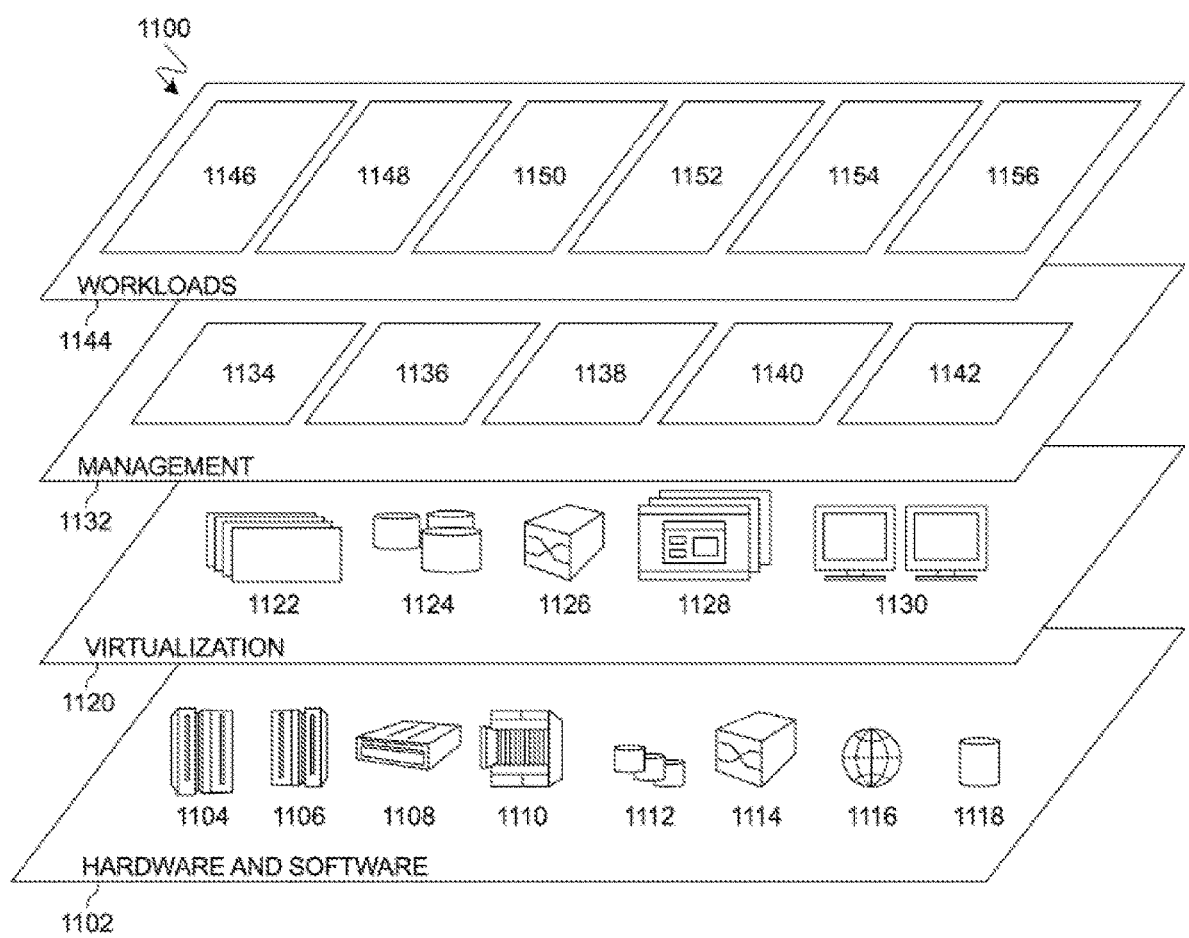
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and quality detection 1156. A quality detection program 110a, 110b provides a way to detect the minimum viable display resolution of media content using optical character recognition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a minimum viable display resolution, the method comprising:
    receiving a video file;
    selecting a plurality key frames in the received video file at a pre-defined frequency;
    scanning the plurality of selected key frames of the received video file in an original resolution using an optical character recognition (OCR) component;
    returning a detected word count from each scanned key frame of the scanned plurality of selected key frames in the original resolution;
    calculating an aggregate detected word count for the original resolution based on the returned detected word count from each scanned key frame of the scanned plurality of selected key frames in the original resolution, wherein the calculated aggregate detected word count from the original resolution represents a first quality indicator of the received video file in the original resolution;
    scanning the plurality of selected key frames of the received video file in the newest resolution using the OCR component;
    returning the detected word count from each scanned key frame of the scanned plurality of selected key frames in the newest resolution;
    calculating the aggregate detected word count for the newest resolution based on the returned detected word count from each scanned key frame of the scanned plurality of selected key frames in the newest resolution, wherein the calculated aggregate detected word count from the newest resolution represents a second quality indicator of the received video file in the newest resolution; and
    in response to determining that the second quality indicator of the newest resolution does not meet a threshold associated with the first quality indicator of the original resolution, discarding the newest resolution of the received video file and storing at least one viable display resolution of the received video file.

2. The method of claim 1, wherein storing the at least one viable display resolution of the received video file further comprises storing at least the original resolution of the received video file.

3. The method of claim 1, further comprising:
    in response to determining that the second quality indicator of the newest resolution does meet the threshold associated with the first quality indicator of the original resolution, transcoding the received video file to a next lowest resolution relative to the newest resolution of the received video file.

4. The method of claim 1, wherein determining that the second quality indicator of the newest resolution does not meet the threshold associated with the first quality indicator of the original resolution further comprises:
    determining that the calculated aggregate detected word count from the scanned plurality of selected key frames in the newest resolution is not more than a pre-defined percentage of the calculated aggregate detected word count from the scanned plurality of selected key frames in the original resolution.

5. The method of claim 1, wherein scanning the plurality of selected key frames of the received video file further comprises:
    determining a time interval for the pre-defined frequency;
    selecting a plurality of timestamps of the received video file based on the determined time interval for the pre-defined frequency; and
    scanning a frame of the received video file at each selected timestamp of the plurality of selected timestamps of the received video file.

6. The method of claim 5, further comprising:
  storing, in a first database, the returned detected word count in the original resolution, at the scanned frame of the received video file at each selected timestamp of the plurality of selected timestamps; and
  storing, in a second database, the returned detected word count in the newest resolution, at the scanned frame of the received video file at each selected timestamp of the plurality of selected timestamps.

7. A computer system for detecting a minimum viable display resolution, comprising:
  one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
  receiving a video file;
  selecting a plurality key frames in the received video file at a pre-defined frequency;
  scanning the plurality of selected key frames of the received video file in an original resolution using an optical character recognition (OCR) component;
  returning a detected word count from each scanned key frame of the scanned plurality of selected key frames in the original resolution;
  calculating an aggregate detected word count for the original resolution based on the returned detected word count from each scanned key frame of the scanned plurality of selected key frames in the original resolution, wherein the calculated aggregate detected word count from the original resolution represents a first quality indicator of the received video file in the original resolution;
  scanning the plurality of selected key frames of the received video file in the newest resolution using the OCR component;
  returning the detected word count from each scanned key frame of the scanned plurality of selected key frames in the newest resolution;
  calculating the aggregate detected word count for the newest resolution based on the returned detected word count from each scanned key frame of the scanned plurality of selected key frames in the newest resolution, wherein the calculated aggregate detected word count from the newest resolution represents a second quality indicator of the received video file in the newest resolution; and
  in response to determining that the second quality indicator of the newest resolution does not meet a threshold associated with the first quality indicator of the original resolution, discarding the newest resolution of the received video file and storing at least one viable display resolution of the received video file.

8. The computer system of claim 7, wherein storing the at least one viable display resolution of the received video file further comprises storing at least the original resolution of the received video file.

9. The computer system of claim 7, further comprising:
  in response to determining that the second quality indicator of the newest resolution does meet the threshold associated with the first quality indicator of the original resolution, transcoding the received video file to a next lowest resolution relative to the newest resolution of the received video file.

10. The computer system of claim 7, wherein determining that the second quality indicator of the newest resolution does not meet the threshold associated with the first quality indicator of the original resolution further comprises:
  determining that the calculated aggregate detected word count from the scanned plurality of selected key frames in the newest resolution is not more than a pre-defined percentage of the calculated aggregate detected word count from the scanned plurality of selected key frames in the original resolution.

11. A computer program product for detecting a minimum viable display resolution, comprising:
  one or more computer-readable tangible storage media and program instructions stored on at least one of the one or more computer-readable tangible storage media, the program instructions executable by a processor to cause the processor to perform a method comprising:
  receiving a video file;
  selecting a plurality key frames in the received video file at a pre-defined frequency;
  scanning the plurality of selected key frames of the received video file in an original resolution using an optical character recognition (OCR) component;
  returning a detected word count from each scanned key frame of the scanned plurality of selected key frames in the original resolution;
  calculating an aggregate detected word count for the original resolution based on the returned detected word count from each scanned key frame of the scanned plurality of selected key frames in the original resolution, wherein the calculated aggregate detected word count from the original resolution represents a first quality indicator of the received video file in the original resolution;
  scanning the plurality of selected key frames of the received video file in the newest resolution using the OCR component;
  returning the detected word count from each scanned key frame of the scanned plurality of selected key frames in the newest resolution;
  calculating the aggregate detected word count for the newest resolution based on the returned detected word count from each scanned key frame of the scanned plurality of selected key frames in the newest resolution, wherein the calculated aggregate detected word count from the newest resolution represents a second quality indicator of the received video file in the newest resolution; and
  in response to determining that the second quality indicator of the newest resolution does not meet a threshold associated with the first quality indicator of the original resolution, discarding the newest resolution of the received video file and storing at least one viable display resolution of the received video file.

12. The computer program product of claim 11, wherein storing the at least one viable display resolution of the received video file further comprises storing at least the original resolution of the received video file.

13. The computer program product of claim 11, further comprising:
  in response to determining that the second quality indicator of the newest resolution does meet the threshold associated with the first quality indicator of the original resolution, transcoding the received video file to a next lowest resolution relative to the newest resolution of the received video file.

14. The computer program product of claim 11, wherein determining that the second quality indicator of the newest resolution does not meet the threshold associated with the first quality indicator of the original resolution further comprises:
determining that the calculated aggregate detected word count from the scanned plurality of selected key frames in the newest resolution is not more than a pre-defined percentage of the calculated aggregate detected word count from the scanned plurality of selected key frames in the original resolution.

* * * * *